United States Patent
Oldfield et al.

(10) Patent No.: US 10,564,025 B2
(45) Date of Patent: Feb. 18, 2020

(54) CAPACITIVE FLUID LEVEL SENSING

(75) Inventors: Barry J. Oldfield, Boise, ID (US); Nissim Henn, Ness Ziona (IL); Assaf Pines, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 1866 days.

(21) Appl. No.: 13/977,916

(22) PCT Filed: Jan. 25, 2011

(86) PCT No.: PCT/US2011/022334
§ 371 (c)(1),
(2), (4) Date: Jul. 1, 2013

(87) PCT Pub. No.: WO2012/102701
PCT Pub. Date: Aug. 2, 2012

(65) Prior Publication Data
US 2013/0297235 A1 Nov. 7, 2013

(51) Int. Cl.
G01F 23/26 (2006.01)
G01F 25/00 (2006.01)

(52) U.S. Cl.
CPC .......... *G01F 23/263* (2013.01); *G01F 23/266* (2013.01); *G01F 23/268* (2013.01); *G01F 25/0061* (2013.01)

(58) Field of Classification Search
CPC .... G01F 21/266; G01F 23/268; G01F 23/263; G01F 25/0061; G01F 23/24; B67D 7/08;
(Continued)

(56) References Cited

U.S. PATENT DOCUMENTS 6,016,697 A * 1/2000 McCulloch .......... G01F 23/266
73/304 C
6,036,296 A 3/2000 Axtell et al.
(Continued)

FOREIGN PATENT DOCUMENTS

CN 200986461 Y 12/2007
KR 20030087765 A 11/2003
WO WO2008049913 A1 5/2008

OTHER PUBLICATIONS

A.G. Chupyra et al., "BINP Capacitive and Ultrasonic Hydrostatic Level Sensors," The 10th International Workshop on Accelerator Alignment, KEK, Tsukuhar Feb. 11-15, 2008.
(Continued)

*Primary Examiner* — Regis J Betsch
*Assistant Examiner* — Kaleria Knox
(74) *Attorney, Agent, or Firm* — HP Inc. Patent Department (57) ABSTRACT

Capacitances are measured for a level measurement capacitive sensor (18) spanning from a lower end to a higher end of a fluid level measurement range (30), a first capacitive calibration sensor (20) below the fluid level measurement range (30), and a second capacitive calibration sensor (22) above the fluid level measurement range (30). A degree to which the lower end of the fluid level measurement range (30) is immersed in a first fluid and the upper end of the fluid level measurement range (30) is immersed in a second fluid is determined based on a capacitance of the level measurement capacitive sensor (18), a first calibration value characterizing the first fluid and derived from a capacitance of the first capacitive calibration sensor (20), and a second calibration value characterizing the second fluid and derived from a capacitance of the second capacitive calibration sensor (22).

20 Claims, 4 Drawing Sheets (58) Field of Classification Search
CPC ... B41J 21/175; B41J 2/175; B41J 2/14; B41J 2/145; B01F 13/0071; F01P 11/14; C09D 11/38
USPC .................................................. 73/304, 861
See application file for complete search history.

(56) References Cited

U.S. PATENT DOCUMENTS

| | | | |
|---|---|---|---|
| 6,431,670 | B1 | 8/2002 | Schantz et al. |
| 6,539,797 | B2 | 4/2003 | Livingston et al. |
| 6,929,343 | B2 | 8/2005 | Farr et al. |
| 7,668,488 | B2 | 2/2010 | Guzman et al. |
| 8,181,516 | B2 * | 5/2012 | Naydenov ............ G01F 23/268 |
| 2004/0074310 | A1 * | 4/2004 | Barlian .................... B67D 7/08 73/861 |
| 2005/0243146 | A1 * | 11/2005 | Essen ...................... B41J 2/145 347/84 |
| 2006/0194331 | A1 * | 8/2006 | Pamula ............... B01F 13/0071 436/150 |
| 2006/0256168 | A1 * | 11/2006 | Einat ......................... B41J 2/14 347/85 |
| 2007/0292162 | A1 | 12/2007 | Regev et al. |
| 2009/0158842 | A1 * | 6/2009 | Fusaro .................... G01F 23/24 73/304 R |
| 2009/0187357 | A1 | 7/2009 | Ho et al. |
| 2009/0235737 | A1 | 9/2009 | Lavon et al. |
| 2010/0154534 | A1 | 6/2010 | Hampton |
| 2010/0225715 | A1 * | 9/2010 | Bachar .................... B41J 2/175 347/86 |
| 2010/0226715 | A1 | 9/2010 | Bechar et al. |
| 2014/0240406 | A1 * | 8/2014 | LaCaze ................... B41J 2/175 347/85 |

OTHER PUBLICATIONS

The International Search Report and the Written Opinion of the International Searching Authority dated Oct. 20, 2011; PCT Application No. PCT/US2011/022334, Filed Jan. 25, 2011.

* cited by examiner

CAPACITIVE FLUID LEVEL SENSING

BACKGROUND

Capacitive level sensors are used to determine fluid levels in a wide variety of different applications. Capacitive fluid level sensors have one or more electrical conductors that are responsive to changes the dielectric properties of the surrounding environment, such as those caused by changes in the material composition in the region of capacitive coupling between the conductors. The fluid level can be determined from the measured capacitance. For example, one or more electrodes can be located at respective fluid levels and changes in the measured electrode capacitance at each location can be detected to obtain an indication of the presence or absence of a fluid near the conductors and hence the fluid level. Alternatively, one or more electrodes may extend continuously along a fluid level dimension and the fluid level can be ascertained by determining the proportion of the electrical conductors that is immersed in the fluid from the measured electrode capacitance.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

A "computer" is any machine, device, or apparatus that processes data according to computer-readable instructions that are stored on a computer-readable medium either temporarily or permanently.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

As used herein, the term "liquid electro printing" (LEP) refers to a process of printing in which ink is printed through an electric field onto a surface to form an electrostatic pattern. In most LEP processes, this pattern is then transferred to at least one intermediate surface, and then to a substrate. The term "liquid electro printer" refers to a printer capable of LEP.

The embodiments that are described herein provide capacitive measurement of relative levels of at least two substantially immiscible fluids in a way that is insensitive to dynamic fluctuations in the dielectric properties of the fluids that might be caused by, for example, temperature changes, pressure changes, and fluid movement. At least some of these embodiments incorporate dynamic measurements of the dielectric properties of the different fluids into the relative fluid level measurements along a measurement dimension to automatically account for changes in the dielectric properties of the fluids. In this way, these embodiments are able to achieve relatively high fluid level measurement accuracy in a wide range of dynamic fluid environments, including highly volatile printer ink receptacles.

Figure 1:
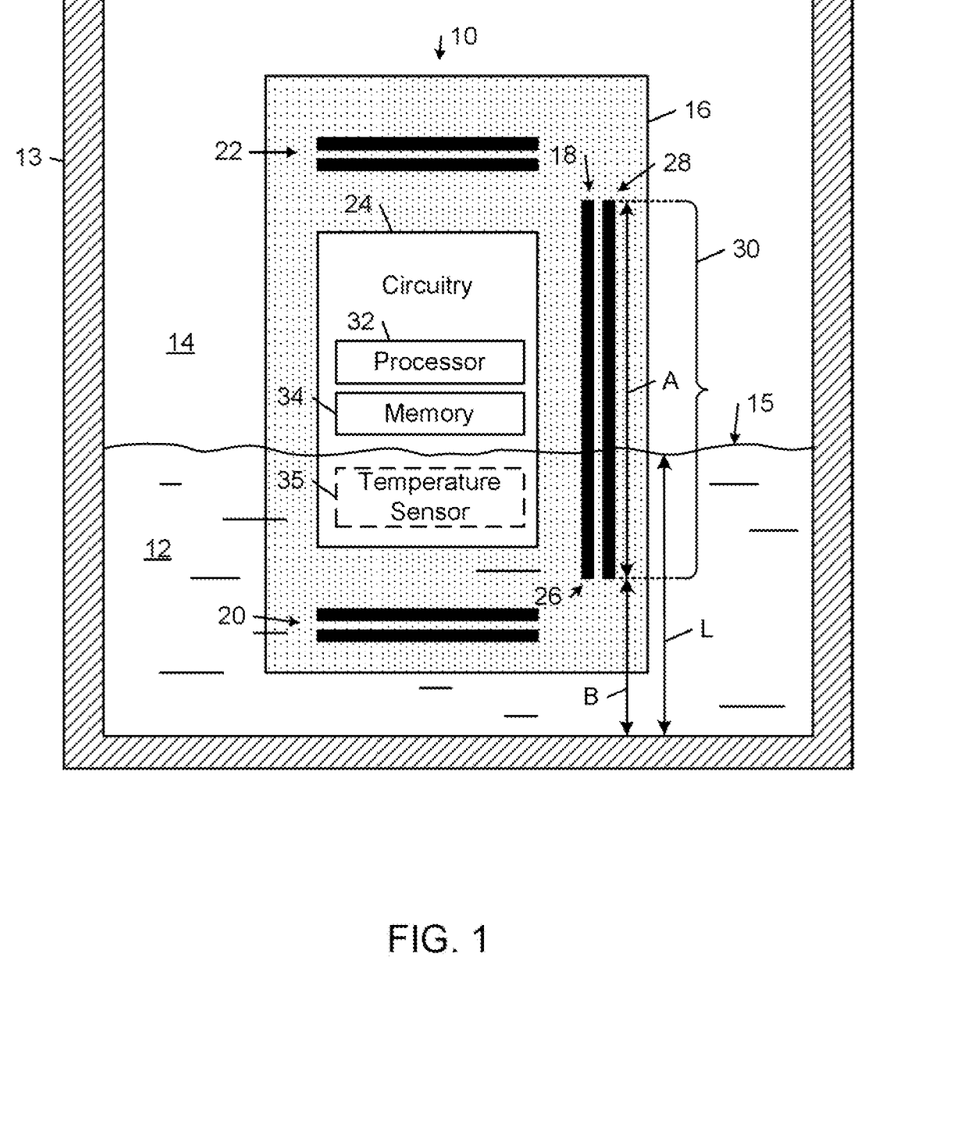
FIG. 1 is a block diagram of a fluid level sensor measuring levels of two substantially immiscible fluids in a container according to an embodiment of the disclosure.

FIG. 1 shows an embodiment of a fluid level sensor 10 that has a first portion that is immersed in a first fluid 12 and a second portion that is immersed in a second fluid 14 in a container 13. The first and second fluids may be any types of substantially immiscible fluids. The immiscible fluids may be, for example: a gas or a mixture of gases (e.g., air and/or a vapor) and a liquid (e.g., water, fuel, ink); two immiscible liquids (e.g., water and an oil-based liquid); and a liquid and a solid (e.g., ink and ink sediment). In one example, the first fluid 12 is a printer ink, and the second fluid is a mixture of air and ink vapor. The first and second fluids 12, 14 meet at a fluid interface 15 that defines the relative levels of the fluids in the container 13.

The fluid level sensor 10 includes a support structure 16, a level measurement capacitive sensor 18, a first capacitive calibration sensor 20, a second capacitive calibration sensor 22, and circuitry 24. In some embodiments, the support structure 16 is a printed circuit board (PCB), the sensors 18-22 include electrical traces formed on the PCB, and the circuitry 24 includes circuit components formed on the PCB. In some embodiments, the sensors 18-22 and the circuitry 24 are coated with an electrically insulating PCB mask layer that protects the sensors 18-22 and the circuitry 24 against direct exposure to the first and second fluids 12, 14. The PCB mask layer allows the fluid level sensor 10 to measure fluid level with fluids that are electrically conductive and without the disruption that otherwise would be caused by direct exposure of the sensors 18-22 to such electrically conductive fluids.

The level measurement capacitive sensor 18 spans from a lower end 26 to a higher end 28 of a fluid level measurement range 30 along a measurement dimension of the support structure 16. The first capacitive calibration sensor 20 is below the lower end of the fluid level measurement range 30, and the second capacitive calibration sensor 22 is above the upper end of the fluid level measurement range 30. In the illustrated embodiment, each of the sensors 18-22 includes at least one pair of electrically conductive traces on the support structure 16. The sizes and shapes of the sensors 18-22 may vary depending on the fluid level measurement application, The circuitry 24 includes a processor 32, a memory 34, an optional temperature sensor 35, and other circuit components (e.g., electrical conductors connected to the sensors 18-22, signal generating components, and signal processing components) for driving the sensors 18-22 and processing the electrical signals generated by the sensors 18-22 in response to the drive signals. The circuitry 24 may be powered by an internal power source (e.g., a battery) or an external power source. In other embodiments, the circuitry 24 includes the sensor electrical traces and other passive components that are coupled through a wired or wireless connection to a remote circuit that drives the circuitry 24 and processes the electrical response signals generated by the sensors 18-22; in these embodiments, the functionality of the processor 32 may be performed by a processing component (e.g., a central processing unit) of the remote circuit.

Figure 2:
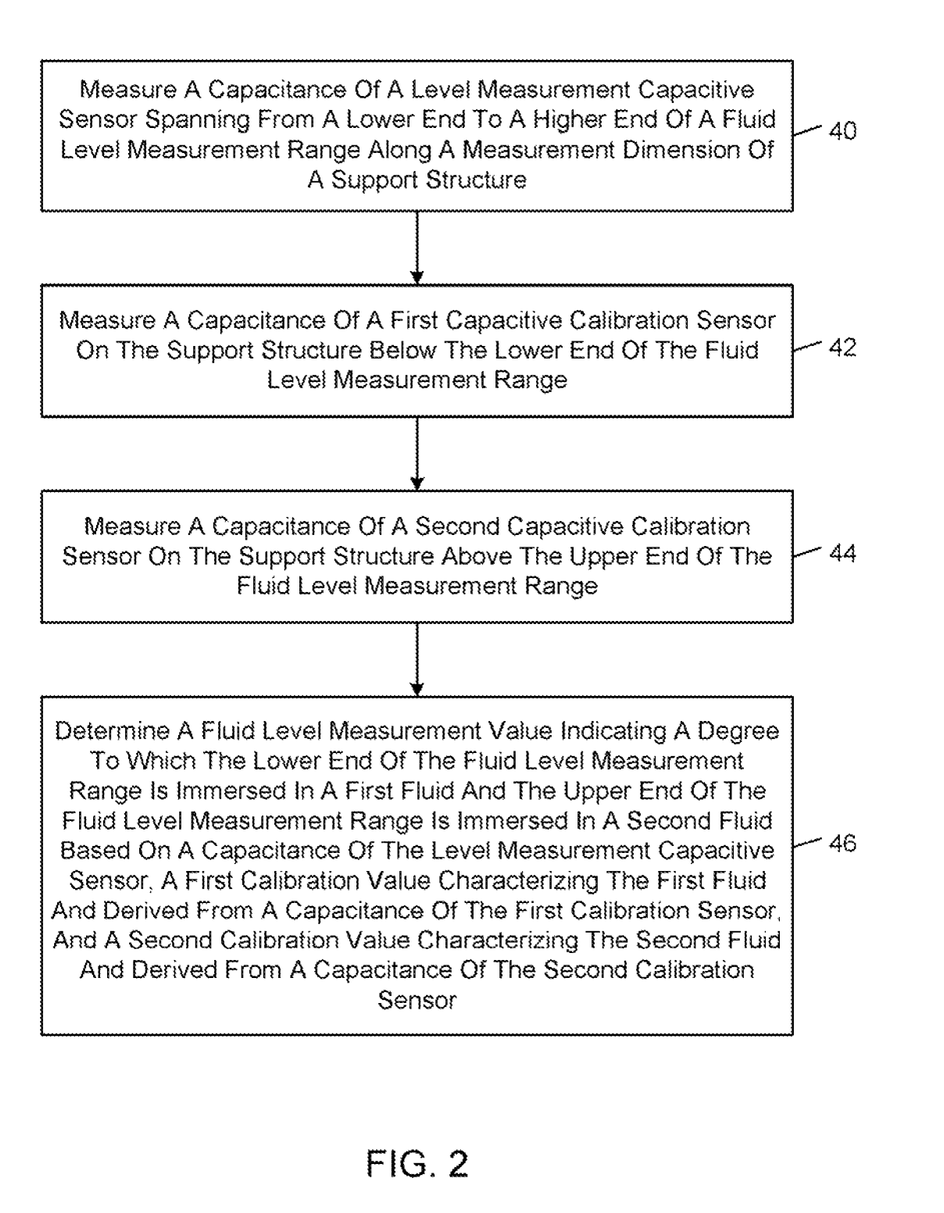
FIG. 2 is a flow diagram of a method according to an embodiment of the disclosure.

FIG. 2 shows an embodiment of a method by which the circuitry 24 provides capacitive measurements of the relative levels of the first and second fluids 12, 14 in a way that automatically accounts for any changes in the dielectric properties of the fluids 12, 14.

In accordance with the method of FIG. 2, the circuitry 24 measures a capacitance of the level measurement capacitive sensor 18 (FIG. 2, block 40), a capacitance of the first capacitive calibration sensor 20 (FIG. 2, block 42), and a capacitance of the second capacitive calibration sensor 22 (FIG. 2, block 44). The circuitry 24 may measure the capacitances of the sensors 18-22 in any of a variety of different ways. For example, the circuitry may measure the capacitances using any of resonant circuit based capacitance measurement techniques, constant current source based capacitance measurement techniques, and step-voltage based capacitance measurement techniques.

After the capacitances of the sensors 18-22 have been measured, the circuitry 24 determines a fluid level measurement value indicating a degree to which the lower end 26 of the fluid level measurement range 30 is immersed in the first fluid 12 and the upper end 28 of the fluid level measurement range 30 is immersed in the second fluid 14 based on a capacitance of the level measurement capacitive sensor 18, a first calibration value characterizing the first fluid and derived from a capacitance of the first calibration sensor 20, and a second calibration value characterizing the second fluid and derived from a capacitance of the second calibration sensor 22 (FIG. 2, block 46). In some embodiments, the fluid level measurement value is derived from a mapping of a distance from the lower end 26 of the fluid level measurement range 30 to the measured level of the fluid interface 15 to a depth level within the container 13.

In some embodiments, in determining the fluid level measurement value, the circuitry 24 accounts for changes in dielectric characteristics at the lower end 26 of the fluid level measurement range 30 based on the capacitance of the first capacitive calibration sensor 20 and accounts for changes in dielectric characteristics at the upper end 28 of the fluid level measurement range 30 based on the capacitance of the second capacitive calibration sensor 22.

In some of these embodiments, the circuitry 24 determines the fluid level measurement value based on a model of the fluid level sensor 10 in which the dielectric characteristics of the first and second fluids 12, 14 are respectively determined from the measured capacitances of the first and second calibration sensors 20, 22 and used to estimate the respective portions of the level measurement capacitive sensor 18 that is immersed in the first and second fluids 12, 14. In particular, the contribution of the portion of the level measurement capacitive sensor 18 that is immersed in the first fluid 12 is estimated based on the measured capacitance of the first calibration sensor 20, and the contribution of the portion of the level measurement capacitive sensor 18 that is immersed in the second fluid 14 is estimated based on the measured capacitance of the second calibration sensor 22.

In one example, the fluid level measurement value is determined based on a model that assumes that the first calibration sensor is immersed completely in the first fluid 12 and the second calibration sensor is immersed completely in the second fluid 14. A mathematical expression of this model is presented in the following paragraphs. The sensors 18-22 initially are measured together in a uniform environment to obtain respective scaling capacitance values, which are used to scale the capacitance values of the sensors that are measured when determining the instantaneous fluid level measurement values. In addition to compensating for differences in the sizes, geometries, and material compositions of the sensors, the scaling of the capacitance measurements by the scaling capacitance values helps to compensate for the differences in fringe fields between the sensors.

The portions of the level measurement capacitive sensor 18 that are respectively immersed in the first and second fluids 12, 14 contribute to the measured capacitance ($C_{m18}$) of the level measurement capacitive sensor 18 as follows:

$$C_{m18} = p \cdot C_1 + (1-p) \cdot C_2 \quad (1)$$

where $C_1$ is the expected capacitance of the level measurement capacitive sensor 18 if it were immersed completely in the first fluid 12, the product $p \cdot C_1$ is the capacitance of the portion (p) of the level measurement capacitive sensor 18 that is immersed in the first fluid 12, $C_2$ is the expected capacitance of the level measurement capacitive sensor 18 if it were immersed completely in the second fluid 14, the product $(1-p) \cdot C_2$ is the capacitance of the portion $(1-p)$ of the level measurement capacitive sensor 18 that is immersed in the second fluid 14, and p has a value between 0 and 1.

Solving for p, equation (1) can be rewritten as follows:

$$p = \frac{C_{m18} - C_2}{C_1 - C_2} \quad (2)$$

In some embodiments, the value p can be converted into the fluid level measurement value (L) in accordance with equation (3):

$$L = A \cdot p + B \quad (3)$$
$$= A \cdot \frac{C_{m18} - C_2}{C_1 - C_2} + B$$

where A and B are respective constant values that are used to map p to a depth level within the container 13; for example, in some embodiments, A is the length of capacitive sensor 18 and B is the distance from the bottom of the container 13 to the bottom of sensor 18 (see FIG. 1).

The measured capacitances $C_{m18}$, $C_{m20}$, and $C_{m22}$ of the level measurement capacitive sensor 18, the first calibration sensors 20, and the second calibration sensor 22 can be used to estimate the values of $C_1$ and $C_2$, as follows:

$$C_1 = f(C_{cal18}, C_{m20}, C_{Cal20}) \quad (4)$$

$$C_2 = g(C_{Cal18}, C_{m22}, C_{Cal22}) \quad (5)$$

where $C_{Cal18}$, $C_{Cal20}$, and $C_{Cal22}$ are calibration capacitances of the level measurement capacitive sensor 18 and the first and second calibration sensors 20, 22 that are measured when the sensors 18-22 collectively are immersed completely in a calibration fluid (e.g., air), f(*) is a function that maps the calibration capacitance $C_{Cal18}$ of the level measurement capacitive sensor 18 to $C_1$, g(*) is a function that maps the calibration capacitance $C_{Cal\ 18}$ of the level measurement capacitive sensor 18 to $C_2$. Equations (4) and (5) are premised on the assumption that the first capacitive calibration sensor is completely immersed in the first fluid 12 and the second capacitive calibration sensor is completely immersed in the second fluid 14.

In some embodiments, the functions f(*) and g(*) are given by equations (6) and (7):

$$f(C_{Cal18}, C_{m20}, C_{Cal20}) = \alpha \cdot C_{Cal18} \cdot \frac{C_{m20}}{C_{Cal20}} \quad (6)$$

$$g(C_{Cal18}, C_{m22}, C_{Cal22}) = \beta \cdot C_{Cal18} \cdot \frac{C_{m22}}{C_{Cal22}} \quad (7)$$

where $\alpha$ and $\beta$ are correction factors that may be determined theoretically based on the sizes, geometries, layout, and material properties of the sensors 18-22, or they may be determined empirically. For ideal sensors, $\alpha=\beta=1$.

By replacing $C_1$ and $C_2$ in equation (3) with the functions $F(C_{Cal18}, C_{m20}, C_{Cal20})$ and $g(C_{Cal18}, C_{m22}, C_{Cal22})$ in accordance with equations (4) and (5) and then solving for p, the fluid level measurement value (L) can be determined from the measured capacitances of the level measurement capacitive sensor 18, the first calibration sensor 20, and the second calibration sensor 22 by evaluating equation (8);

$$L = A \cdot \frac{C_{m18} - g(C_{Cal18}, C_{m22}, C_{Cal22})}{f(C_{Cal18}, C_{m20}, C_{Cal20}) - g(C_{Cal18}, C_{m22}, C_{Cal22})} + B \quad (8)$$

By determining the fluid level measurement value (L) in this way, the circuitry 24 can account for changes in dielectric characteristics at the lower end 26 of the fluid level measurement range 30 based on the capacitance of the first capacitive calibration sensor 20 and can account for changes in dielectric characteristics at the upper end 28 of the fluid level measurement range 30 based on the capacitance of the second capacitive calibration sensor 22.

Embodiments that include the optional temperature sensor 35 (see FIG. 1) may be configured to measure not only the level but also the quantity of fluid in in the container 13 in a way that compensates for artifact variations in liquid volume caused by variations of the liquid temperature. This feature has particular utility for applications, such as ink-based printer applications, that need to control and maintain a substantially constant quantity of one or more of the fluids in the container 13. For example, in a typical digital LEP printer, the level in the ink tank is at its maximum when the pumps are turned off and all of the ink has drained back into the tank. Before a print job is started, pumps are turned on and ink flows through the binary ink developers (BIDs), which result in a large amount of ink volume being removed from the ink tank to fill the hoses and BID. If the ink tank is full (L=L_full) with pumps off, the ink level will drop to a significantly lower operating level (L=L_oper) when the pumps are turned on.

While the pumps are on, ink is added to the tank at the same time the ink temperature is changing. It is important not to add too much ink to the ink tank during this state so as to avoid having the ink tank overflow when the pumps are turned off.

The volume of a fluid as a function of temperature can be described by the following equation:

$$V(T) = V_0 + \alpha \cdot (T - T_0) \quad (9)$$

where V(T) is the fluid volume as a function of the fluid temperature (T), the parameter a is the thermal expansion coefficient of the fluid, and $T_0$ is a reference temperature of the fluid at which the liquid volume is $V_0$.

Based on equation (7), embodiments of the circuitry 24 can compensate for changes in fluid volume caused by changes in temperature in order to maintain a target quantity of fluid in the container 13. For example, in some embodiments, the circuitry 24 compensates for thermal expansion based on equation (7), the cross-sectional area (A) of the container 13, and the instantaneous temperature T of the fluid measured by the temperature sensor 35. In these embodiments, the change in fluid level ($\Delta H(T)$) due to temperature change is given by:

$$\Delta H(T) = \frac{1}{A} \cdot (V(T) - V_0) \quad (10)$$

In these embodiments, the circuitry 24 may be configured to maintain the fluid quantity constant by offsetting the measured fluid level (L) by the change in fluid level ($\Delta H(T)$) due to temperature. In a closed-loop process, a controller coupled to the circuitry 24 iteratively may maintain the fluid in the container 13 at a level that approaches $H_0 + \Delta H$ instead of $H_0$, where $H_0$ is the nominal liquid quantity at the temperature $T_0$.

Because of its ability to achieve relatively high fluid level measurement accuracy in a wide range of dynamic fluid environments, the fluid level sensor 10 has particular utility in measuring levels and/or quantities of printer inks, which are subject to sporadic changes in temperature, pressure, and ink level. For example, in some embodiments, the fluid level sensor 10 may be used produce an "out-of-fluid" signal when the printing fluid volume drops below a predetermined level in the printing fluid reservoir, or to produce an indication of how much printing fluid remains in the printing ink reservoir.

In general, embodiments of the fluid level sensor 10 may be incorporated into any type of printing device, including a printer, facsimile machine, copier, or a hybrid device that combines the functionalities of more than one of these devices. In an illustrative example, FIGS. 3 and 4 show an embodiment 52 of the fluid level sensor (FLS) 10 that is able to monitor the level and quantity of ink in an embodiment of a digital LEP system 100.

Figure 3:
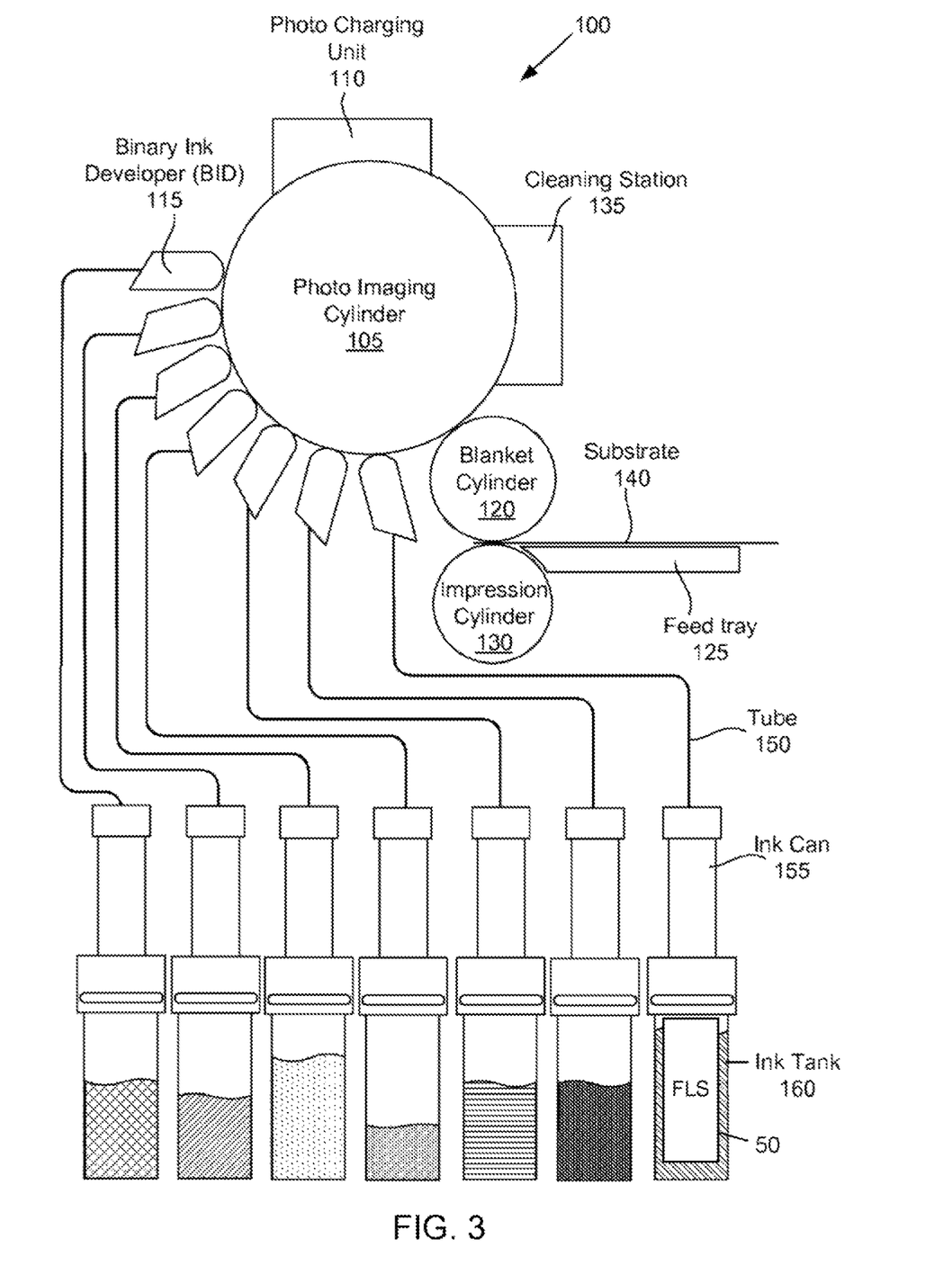
FIG. 3 is a block diagram illustrating the basic components of a digital liquid electro printer system according to an embodiment of the disclosure.
Figure 4:
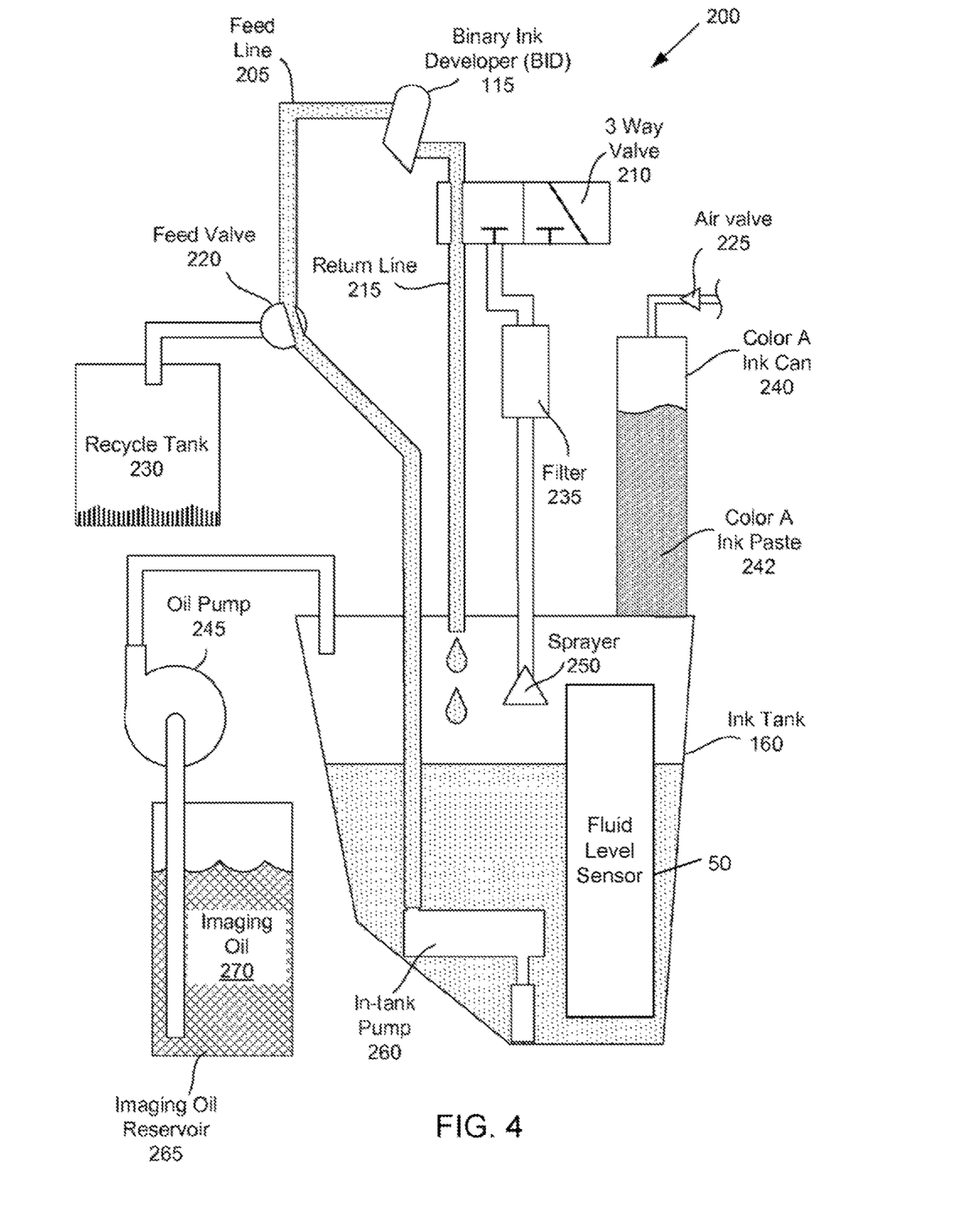
FIG. 4 is a block diagram of a fluid level sensor measuring levels of printer ink and an overlying vapor in a liquid electro printing (LEP) ink receptacle according to an embodiment of the disclosure.

Referring to FIG. 3, in an exemplary operation of the digital LEP system 100, a desired image is initially formed on a photo imaging cylinder 105, transferred to a blanket cylinder 120, and then transferred to a substrate 140. The desired image is communicated to the printing system 100 in digital form. The desired image may be text, pictures, black/white images, partial color, full color images, or any combination of text and images.

According to one illustrative embodiment, an image is formed on the photo imaging cylinder 105 by rotating a clean, bare segment of the photo imaging cylinder 105 under a photo charging unit 110. A uniform static charge is deposited on the photo imaging cylinder 105 by a corona wire. As the photo imaging cylinder 105 continues to rotate, it passes through the laser imaging portion of the photo charging unit 110. A number of diode lasers dissipate the static charges in portions of the image area to leave an invisible electrostatic charge pattern that replicates the image to be printed.

A number of ink tanks 160 contain inks that are supplied to corresponding Binary Ink Developer (BID) units 115. There is one BID unit 115 for each ink color. According to one illustrative embodiment, the ink is supplied in concentrated form in an ink can 155. Concentrated ink paste is dispensed from the ink can 155 into the ink tank 160. In the ink tank 160, the concentrated paste is mixed with imaging oil to form the ink. The characteristics of the ink in the ink tank 160 are carefully controlled to maintain the printing quality of the system. For example, the ink tank 160 may contain a number of sensors which detect the temperature, density, amount, and flow rate of the ink. If any of these parameters drift out of a set range, appropriate correction is taken. For example, if the temperature of the ink is too high, coolant may be circulated through a heat exchanger in the ink tank to cool the ink. If the density of the ink is too low, more ink solids may be added from the ink can 155. In some embodiments, the level sensor has enough resolution and speed that it can be used to monitor the rate of ink level drop when the pumps are turned on (e.g., going from L_full to L_oper); this rate, along with the knowledge of the cross sectional area of the tank, then can be used to calculate the flow rate to the BIDs.

A pump inside the ink tank 160 provides the associated BID 115 with the desired amount of ink through a tube 150. The excess ink from the BID is returned to the ink tank 160 through a separate return line. This excess ink is reconditioned in the ink tank 160 and recirculated to the BID 115.

During printing, the appropriate BID unit is engaged with the photo imaging cylinder 105. The engaged BID unit presents an inking roller which has a uniform film of ink to the photo imaging cylinder 105. The ink contains electrically charged pigment particles which are attracted to the opposing electrical fields on the image areas of the photo imaging cylinder 105. The ink is repelled from the non-image areas. The photo imaging cylinder 105 now has a single color ink image on its surface. According to illustrative embodiment, the photo imaging cylinder 105 continues to rotate and transfers the ink image to a blanket cylinder 120. The process of transferring the ink image from its origin on the photo imaging cylinder is called "offset printing." The offset printing method has several advantages. First, the offset process protects the photo imaging cylinder from wear which would occur if the substrate was to directly contact the photo imaging cylinder. Second, the blanket cylinder 120 is covered with a renewable rubber blanket. This rubber blanket compensates for unevenness of the substrate surface and deposits ink uniformly into the bottom of any depressions or grain. Consequently, the illustrative digital LEP system can print on a very wide range of substrate surfaces, textures, and thicknesses.

The substrate 140 enters the printing system 100 from the right, passes over a feed tray 125, and is wrapped onto the impression cylinder 130. As the substrate 140 contacts the blanket cylinder 120, the single color ink image is transferred to the substrate 140.

The photo imaging cylinder 105 continues to rotate and brings the portion of the cylinder surface which previously held the ink image into a cleaning station 135. The cleaning station 135 serves multiple purposes, including cleaning any stray particulates or fluids from the photo imaging cylinder 105 and cooling the outer surface of the photo imaging cylinder 105. The creation, transfer, and cleaning of the photo imaging cylinder 105 is a continuous process, with hundreds of images being created and transferred per minute.

To form a single color image (such as a black and white image), one pass of the substrate between the impression cylinder 130 and blanket cylinder 120 completes transfer of the image. For a multiple color image, the substrate is retained on the impression cylinder and makes multiple contacts with the blanket cylinder 120. At each contact, an additional color is placed on the substrate. For example, to generate a four color image, the photo charging unit 110 forms a second pattern on the photo imaging cylinder 105) which receives the second ink color from a second binary ink developer. As described above, this second ink pattern is transferred to the blanket cylinder 120 and impressed onto the substrate as it continues to rotate with the impression cylinder 130. This continues until the desired image is formed on the substrate. Following the complete formation of the desired image on the substrate 140, the substrate 140 can exit the machine or be duplexed to create second image on the opposite surface of the substrate 140.

As shown in FIG. 3, there may be a number of ink tanks and associated BIDs 115. A widely used offset printing technique is to use four process colors: Cyan, Magenta, Yellow, and Key (black). Some more advance processes use six process colors to compensate for limitations in the four-color method. Additionally, spot colors may be desirable to achieve the desired visual or textual effect. For example, spot colors may produce metallic, fluorescent, spot varnish, coating, or other effects. Custom spot colors may be mixed on site or ordered. These custom spot colors may be more efficient in generating the desired color and/or provide specialized visual effects on the printed substrate. For example, spot colors are particularly effective in security printing, such as money, passports, bonds and other printed documents.

The advantages of the illustrative digital offset LEP system described above include consistent dot gain, optical densities, and colors. Because the printing system is digital, the operator can change the image being printed at any time and without any reconfiguration. Further, the printing system produces uniform image gloss, a broad range of ink colors, compatibility with a wide variety of substrate types, and instantaneous image drying.

FIG. 2 is a diagram of an illustrative ink delivery system 200. As discussed above, a color A ink paste 242 may be contained in a color A ink can 240. The color A ink paste 242 may be forced out of the ink can using pressurized air. The introduction of the pressurized air into the ink can 240 is controlled by an air valve 225. According to one illustrative embodiment, the air valves 225, as well as other valves in the ink delivery system, are computer controlled and allow automatic adjustment of the system configuration.

The color A ink paste 242 enters the ink tank 160, where it is mixed with imaging oil 270. The imaging oil 270 serves as a fluid carrier for the ink particles and is supplied as needed from an imaging oil reservoir 265 by an oil pump 245.

As discussed above, the ink tank 160 contains a number of sensors and conditioning devices. For example, the ink tank 160 may contain a heating coil, a cooling coil, and an embodiment of the fluid level sensor (FLS) 10 that is able to monitor the level and quantity of ink in the digital LEP system 100 as described above.

During a printing run, the in-tank pump 260 provides conditioned color A ink 255 to the BID 115 at a pressure and flow rate within acceptable ranges through a feed line 205. The feed line passes through a feed valve 220 and connects to the BID 115. The BID 115 presents a uniform film of color A ink to the photo imaging cylinder 105, FIG. 1). A portion of the ink solids within the color A ink are transferred from BID 115 to the photo-imaging cylinder 105, FIG. 1). The majority of imaging oil 270 and a portion of the ink solids are returned to the ink tank 160 through a return line 215 for reconditioning.

In some embodiments, the fluid level sensor 50 produces ink level signals and temperature measurement signals that are used by a controller to control the ink levels and quantities in the ink tanks 160, produce an "out-of-fluid" signal when the volume of ink in an ink tank 160 drops below a predetermined level, and produce an indication of how much printing fluid remains in the ink tanks 160.

Other embodiments are within the scope of the claims.

The invention claimed is:

1. Apparatus, comprising:
   a support structure comprising a measurement dimension;
   a level measurement capacitive sensor spanning from a lower end to a higher end of a fluid level measurement range along the measurement dimension of the support structure;
   a first capacitive calibration sensor spaced apart from and below the lower end of the level measurement capacitive sensor;
   a second capacitive calibration sensor spaced apart from and above the upper end of the level measurement capacitive sensor; and
   circuitry disposed on the support structure to determine a fluid level measurement value indicating a degree to which the lower end of the level measurement capacitive sensor is immersed in a first fluid and the upper end of the level measurement capacitive sensor is immersed in a second fluid based on a capacitance of the level measurement capacitive sensor, a first calibration value characterizing the first fluid and derived from a capacitance of the first capacitive calibration sensor, and a second calibration value characterizing the second fluid and derived from a capacitance of the second capacitive calibration sensor;
   wherein, in determining the fluid level measurement value, the circuitry accounts for changes in dielectric characteristics at the lower end of the fluid level measurement range based on the capacitance of the first capacitive calibration sensor; and
   wherein, in determining the fluid level measurement value, the circuitry accounts for changes in dielectric characteristics at the upper end of the fluid level measurement range based on the capacitance of the second capacitive calibration sensor.

2. The apparatus of claim 1, wherein each of the level measurement capacitive sensor, the first capacitive calibration sensor, and the second capacitive calibration sensor respectively comprises multiple spaced-apart electrical conductors arranged along a length of each of the level measurement capacitive sensor, the first capacitive calibration sensor, and the second capacitive calibration sensor, respectively.

3. The apparatus of claim 2, wherein the circuitry is coupled to the respective electrical conductors of the level measurement capacitive sensor, the first capacitive calibration sensor, and the second capacitive calibration sensor, and is to measure electrical signals indicative of the respective capacitances of the level measurement capacitive sensor, the first capacitive calibration sensor, and the second capacitive calibration sensor.

4. The apparatus of claim 1, wherein the circuitry is to determine the fluid level measurement value in accordance with:

$$L = A \frac{C_{m18} - g(C_{Cal18}, C_{m22}, C_{Cal22})}{f(C_{Cal18}, C_{m20}, C_{Cal20}) - g(C_{Cal18}, C_{m22}, C_{Cal22})} + B$$

wherein L is the fluid level measurement value, $C_{m18}$, $C_{m20}$, and $C_{m22}$ are the capacitances of the level measurement capacitive sensor, the first calibration sensor, and the second calibration sensor when the lower end of the fluid level measurement range is immersed in the first fluid and the upper end of the fluid level measurement range is immersed in the second fluid, $C_{cal18}$, $C_{cal20}$, and $C_{cal22}$ are calibration capacitances of the level measurement capacitive sensor, the first calibration sensor, and the second calibration sensor when the sensors collectively are immersed in a calibration fluid, f(*) is a function that maps $C_{cal18}$, $C_{m20}$, and $C_{cal20}$ to an estimate of the capacitance $C_{m18}$ of the level measurement capacitive sensor if it were fully immersed in the first fluid, g(*) is a function that maps $C_{cal18}$, $C_{m22}$, and $C_{cal22}$ to an estimate of the capacitance $C_{m18}$ of the level measurement capacitive sensor if it were fully immersed in the second fluid, and A and B are respective constant values related to a depth level of the level measurement capacitive sensor relative to a container containing the first and second fluids.

5. The apparatus of claim 1, wherein the circuitry determines from a change in the fluid level measurement value a rate of flow of the fluid into and out of a container containing the first and second fluids.

6. The apparatus of claim 1, further comprising a temperature sensor to measure a temperature of the first fluid,
   wherein, in determining the fluid level measurement value, the circuitry compensates for changes in fluid volume caused by changes in temperature based on the temperature measured by the temperature sensor.

7. The apparatus of claim 6, wherein a coolant is added when the temperature sensor indicates a temperature of the first fluid is below a predetermined amount.

8. The apparatus of claim 6, wherein the circuitry determines a quantity of the first fluid in a container based on the temperature measured by the temperature sensor.

9. The apparatus of claim 1, wherein the support substrate is a printed circuit board.

10. The apparatus of claim 1, wherein ink solid is added when a density of ink is below a predetermined amount.

11. A method, comprising:
    measuring a capacitance of a level measurement capacitive sensor spanning from a lower end to a higher end of a fluid level measurement range along a measurement dimension of a support structure in an ink tank;
    measuring a capacitance of a first capacitive calibration sensor on the support structure below the lower end of the fluid level measurement range;
    measuring a capacitance of a second capacitive calibration sensor on the support structure above the upper end of the fluid level measurement range;
    determining a fluid level measurement value indicating a degree to which the lower end of the fluid level measurement range is immersed in a first fluid and the upper end of the fluid level measurement range is immersed in a second fluid based on a capacitance of the level measurement capacitive sensor, a first calibration value characterizing the first fluid and derived from a capacitance of the first capacitive calibration sensor, and a second calibration value characterizing the second fluid and derived from a capacitance of the second capacitive calibration sensor;

determining from a change in a number of fluid level measurement values a rate of flow of the fluid into and out of a container containing the first and second fluids;

pumping ink from the ink tank into binary ink developers to operate a printer;

sensing a temperature of ink in the ink tank using a temperature sensor; and selectively adding ink to the ink tank based on output of the temperature sensor, the level measurement capacitive sensor and the first and second capacitive calibration sensors to avoid an overflow in the ink tank when pumping is discontinued and ink from the binary ink developers drains back to the ink tank;

wherein the determining comprises accounting for changes in dielectric characteristics at the lower end of the fluid level measurement range based on the capacitance of the first capacitive calibration sensor; and wherein the determining comprises accounting for changes in dielectric characteristics at the upper end of the fluid level measurement range based on the capacitance of the second capacitive calibration sensor.

12. The method of claim 11, further comprising determining from a change in the fluid level measurement value a rate of flow of the fluid into and out of a container containing the first and second fluids.

13. The method of claim 11, wherein the determining comprises compensating for changes in fluid volume caused by changes in temperature of the first fluid.

14. At least one non-transitory computer-readable medium comprising processor-readable program code embodied therein, the processor-readable program code adapted to be executed by a processor to implement the method of claim 11:

wherein each of the level measurement capacitive sensor, the first capacitive calibration sensor, and the second capacitive calibration sensor respectively comprises multiple spaced-apart electrical conductors arranged along a length of each of the level measurement capacitive sensor, the first capacitive calibration sensor, and the second capacitive calibration sensor, respectively, and wherein circuitry is coupled to the respective electrical conductors of the level measurement capacitive sensor, the first capacitive calibration sensor, and the second capacitive calibration sensor, and measures electrical signals indicative of the respective capacitances of the level measurement capacitive sensor, the first capacitive calibration sensor, and the second capacitive calibration sensor.

15. The computer-readable medium of claim 14, wherein each of the level measurement capacitive sensor, the first capacitive calibration sensor, and the second capacitive calibration sensor respectively comprises multiple spaced-apart electrical conductors arranged along a length of each of the level measurement capacitive sensor, the first capacitive calibration sensor, and the second capacitive calibration sensor, respectively.

16. The computer-readable medium of claim 15, wherein the circuitry is coupled to the respective electrical conductors of the level measurement capacitive sensor, the first capacitive calibration sensor, and the second capacitive calibration sensor, and measures electrical signals indicative of the respective capacitances of the level measurement capacitive sensor, the first capacitive calibration sensor, and the second capacitive calibration sensor.

17. The computer-readable medium of claim 14, wherein the method further comprises determining the fluid level measurement value in accordance with:

$$L = A \frac{C_{m18} - g(C_{Cal18}, C_{m22}, C_{Cal22})}{f(C_{Cal18}, C_{m20}, C_{Cal20}) - g(C_{Cal18}, C_{m22}, C_{Cal22})} + B$$

wherein L is the fluid level measurement value, $C_{m18}$, $C_{m20}$, and $C_{m22}$ are the capacitances of the level measurement capacitive sensor, the first calibration sensor, and the second calibration sensor when the lower end of the fluid level measurement range is immersed in the first fluid and the upper end of the fluid level measurement range is immersed in the second fluid, $C_{cal18}$, $C_{cal20}$, and $C_{cal22}$ are calibration capacitances of the level measurement capacitive sensor, the first calibration sensor, and the second calibration sensor when the sensors collectively are immersed in a calibration fluid, $f(*)$ is a function that maps $C_{cal18}$, $C_{m20}$, and $C_{cal20}$ to an estimate of the capacitance $C_{m18}$ of the level measurement capacitive sensor if it were fully immersed in the first fluid, $g(*)$ is a function that maps $C_{cal18}$, $C_{m22}$, and $C_{cal22}$ to an estimate of the capacitance $C_{m18}$ of the level measurement capacitive sensor if it were fully immersed in the second fluid, and A and B are respective constant values.

18. The computer-readable medium of claim 14, wherein the circuitry determines from a change in the fluid level measurement value a rate of flow of the fluid into and out of a container containing the first and second fluids.

19. The method of claim 11, wherein ink is selectively added to maintain a target quantity of ink.

20. Apparatus, comprising:
a support structure comprising a printed circuit board;
a level measurement capacitive sensor spanning from a lower end to a higher end of a fluid level measurement range along a measurement dimension of the support structure;
a first capacitive calibration sensor below the lower end of the level measurement capacitive sensor;
a second capacitive calibration sensor above the upper end of the level measurement capacitive sensor; and
circuitry to determine a fluid level measurement value indicating a degree to which the lower end of the level measurement capacitive sensor is immersed in a first fluid and the upper end of the level measurement capacitive sensor is immersed in a second fluid based on a capacitance of the level measurement capacitive sensor, a first calibration value characterizing the first fluid and derived from a capacitance of the first capacitive calibration sensor, and a second calibration value characterizing the second fluid and derived from a capacitance of the second capacitive calibration sensor;
wherein the three capacitive sensors and the circuitry are coated with an insulating mask layer on the printed circuit board to protect from exposure to the fluids.

* * * * *